(12) United States Patent
Pradeep (10) Patent No.: US 10,479,967 B2
(45) Date of Patent: Nov. 19, 2019

(54) SYSTEM AND METHOD FOR FERMENTATION

(71) Applicant: Anantha Pradeep, Piedmont, CA (US)

(72) Inventor: Anantha Pradeep, Piedmont, CA (US)

(*) Notice: Subject to any disclaimer, the term of this patent is extended or adjusted under 35 U.S.C. 154(b) by 0 days.

(21) Appl. No.: 15/133,179

(22) Filed: Apr. 19, 2016

(65) Prior Publication Data

US 2017/0298311 A1    Oct. 19, 2017

(51) Int. Cl.
*C12G 1/036* (2006.01)
*C12G 3/02* (2019.01)
*C12G 1/022* (2006.01)
*C12G 1/02* (2006.01)
*C12G 3/07* (2006.01)

(52) U.S. Cl.
CPC ......... *C12G 1/0206* (2013.01); *C12G 1/0203* (2013.01); *C12G 3/02* (2013.01); *C12G 3/07* (2019.02)

(58) Field of Classification Search
CPC ....... C12G 1/0206; C12G 1/0203; C12G 3/02
USPC ......................................... 425/110
See application file for complete search history.

(56) References Cited

U.S. PATENT DOCUMENTS

| | | | | |
|---|---|---|---|---|
| 4,346,113 A | * | 8/1982 | Faust | C12N 1/16 426/12 |
| 4,350,765 A | * | 9/1982 | Chibata | C12P 7/06 426/11 |
| 4,929,452 A | * | 5/1990 | Hamdy | C12C 11/075 426/11 |

* cited by examiner

*Primary Examiner* — Hamid R Badr
(74) *Attorney, Agent, or Firm* — Kwan & Olynick LLP (57) ABSTRACT

In general, certain embodiments of the present disclosure provide devices and methods for fermentation. According to various embodiments, a device is provided comprising a container for housing an amount of a carbohydrate solution therein. An atomizer coupled to the container converts the carbohydrate solution into an aerosol suspension of particles that is emitted into a first chamber. A first panel separating the first chamber from a second chamber includes a fermentation agent thereon. The carbohydrate solution is emitted as the aerosol suspension of particles into the first chamber and onto the first panel such that the carbohydrate solution is fermented by the fermentation agent. The carbohydrate solution is collected in the second chamber and is returned to the atomizer until the carbohydrate solution has been fermented to a desired state. In certain embodiments, the fermentation agent comprises a yeast culture or other microorganism.

17 Claims, 7 Drawing Sheets

```
                    ┌─ 400
          Method for rapid fermentation.

┌─ 403
                                    Produce a carbohydrate solution from the
                    ┌─ 401            carbohydrate supply.
          Input a carbohydrate        The carbohydrate solution is
          supply into a               produced by a processing
          compartment.                mechanism coupled to the
                                      compartment.
                                                                    └─ 425
                    ┌─ 405
          House an amount of the
          carbohydrate solution within a
          container.
                                                    ┌─ 407
                                          Measure a sugar
                    ┌─ 411                content of the
          Convert the carbohydrate solution          carbohydrate
          into an aerosol suspension of              solution.
          particles with an atomizer coupled
          to the container.                          ┌─ 409
                                          Measure a pH level of
                                          the carbohydrate
                                          solution.
                    ┌─ 413
          Emit the carbohydrate solution, as the
          aerosol suspension of particles, into a
          first chamber separated from a second
          chamber by a first panel.  (B)

┌─ 419                         ┌─ 415
          Return the carbohydrate           Collect the carbohydrate
          solution to the atomizer          solution in the second
          until the carbohydrate            chamber.
          solution has been
          fermented to a desired                    ┌─ 417
          state.                            Measure an alcohol
                                            level of the
                                            carbohydrate
                                            solution.
                    (A)
                                                    FIG. 4A
```

```
                                    ┌─ 421
              ┌─────────────────────────────────────┐
              │  Emit the carbohydrate solution, as the │
              │  aerosol suspension of particles, onto a │
              │  second panel that includes a flavor agent. │
    ┌───┐     ├─────────────────────────────────────┤
    │ A ├───▶ │  The carbohydrate solution is infused  │─ 437
    └───┘     │  with a particular flavor or aroma of the │
              │            flavor agent.              │
              ├─────────────────────────────────────┤
              │   The flavor agent includes crushed   │─ 439
              │              wood.                   │
              └─────────────────────────────────────┘
                                │
                                ▼              ┌─ 423
              ┌─────────────────────────────────────┐
              │     Dissolve a gas into the carbohydrate  │
              │                solution.                │
              └─────────────────────────────────────┘
                                │
                                ▼     ┌─ 441
                            ╭───────╮
                            │  End. │
                            ╰───────╯

┌─────────────────────────────────────┐
              │  ┌───────────────────────────────┐  │─ 427
              │  │    The first panel includes a    │  │
    ┌───┐     │  │    fermentation agent thereon.   │  │
    │ B │     │  ├───────────────────────────────┤  │
    └─┬─┘     │  │ The fermentation agent comprises a │─ 429
      │       │  │ yeast culture or other microorganism. │
      │       │  ├───────────────────────────────┤  │
      │       │  │ The first panel includes a porous medium │─ 431
      │       │  │ that allows the carbohydrate solution to │
      │       │  │           pass through.          │  │
      │       │  └───────────────────────────────┘  │
      │       │  ┌───────────────────────────────┐  │
      └──────▶│  │ The carbohydrate solution is emitted onto the first │─ 433
              │  │  panel such that the carbohydrate solution is │
              │  │   fermented by the fermentation agent.   │
              │  └───────────────────────────────┘  │
              │  ┌───────────────────────────────┐  │
              │  │ The first chamber and the second chamber are │─ 435
              │  │  pressurized such that movement of the   │
              │  │ carbohydrate solution through the first panel into │
              │  │    the second chamber is accelerated.    │
              │  └───────────────────────────────┘  │
              └─────────────────────────────────────┘
```

*FIG. 4B*

SYSTEM AND METHOD FOR FERMENTATION

TECHNICAL FIELD

The present disclosure relates generally to beverage and food preparation, and more specifically to the rapid fermentation of alcoholic beverages.

BACKGROUND

Wine and other alcoholic beverages are typically made by fermenting liquid containing sugars and other carbohydrates, such as grape juice. Fermentation generally occurs by utilizing yeast cultures to convert the sugars into alcohol and carbon dioxide. Winemaking can be a time consuming and labor intensive process and the fermentation process can take from two and a half weeks to a month to complete. Additionally, the process of winemaking, or fermenting other alcoholic beverages, often involves many complicated steps, such as racking and clearing to remove yeast cells and other debris, before the wine can be consumed.

Furthermore, to improve the quality of a wine, the wine may be aged for weeks to years in barrels made of oak or other wood in which complex chemical reactions involving a wine's sugars, acids, and phenolic compounds, such as tannins, can alter the aroma, color, mouthfeel, and taste of the wine in a way that may be more pleasing to the taster.

Thus, there is a need for an improved method and system for rapidly fermenting a carbohydrate solution, such as grape juice, into an alcoholic beverage in less time and with less labor.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide devices and methods for rapid fermentation. According to various embodiments, a device is provided comprising a container for housing an amount of a carbohydrate solution therein. The device further comprises an atomizer coupled to the container. In some embodiments, the atomizer converts the carbohydrate solution into an aerosol suspension of particles that is emitted into a first chamber. The device further comprises a first panel separating the first chamber from a second chamber. The first panel includes a fermentation agent thereon, and the carbohydrate solution is emitted as the aerosol suspension of particles into the first chamber and onto the first panel such that the carbohydrate solution is fermented by the fermentation agent. The carbohydrate solution is collected in the second chamber and is returned to the atomizer until the carbohydrate solution has been fermented to a desired state.

In some embodiments, the fermentation agent comprises a yeast culture or other microorganism. In some embodiments, the first panel includes a porous medium that allows the carbohydrate solution to pass through. In some embodiments, the first chamber and the second chamber are pressurized such that the movement of the carbohydrate solution through the first panel into the second chamber is accelerated. In other embodiments, the device further comprises a second panel that includes a flavor agent. The carbohydrate solution is emitted as the aerosol suspension of particles onto the second panel such that the carbohydrate solution is infused with a particular flavor or aroma of the flavor agent. In some embodiments, the flavor agent includes crushed wood.

In other embodiments, the device further comprises an intake compartment for input of a carbohydrate supply and a processing mechanism coupled to the compartment. The processing mechanism produces the carbohydrate solution from the carbohydrate supply. In other embodiments, the device further comprises a detector for measuring one or more of the following: a sugar content of the carbohydrate solution, a pH level of the carbohydrate solution, and an alcohol level of the carbohydrate solution. In other embodiments, the device further comprises a carbonator for dissolving carbon dioxide into the carbohydrate solution. In other embodiments, the device further comprises an aerator for circulating air through the carbohydrate solution.

Other implementations of this aspect include corresponding systems, apparatus, and computer programs, configured to perform the actions of the described device. These other implementations may each optionally include one or more of the following features. For instance, a system is provided that further includes one or more processors and memory.

In yet a further embodiment, a method for rapid fermentation is provided comprising housing an amount of carbohydrate solution within a container. The method further comprises converting the carbohydrate solution into an aerosol suspension of particles with an atomizer coupled to the container. The method further comprises emitting the carbohydrate solution, as the aerosol suspension of particles, into a first chamber separated from a second chamber by a first panel. The first panel includes a fermentation agent thereon and the carbohydrate solution is emitted onto the first panel such that the carbohydrate solution is fermented by the fermentation agent. The method further comprises collecting the aerosol suspension of particles in the second chamber and returning the carbohydrate solution to the atomizer until the carbohydrate solution has been fermented to a desired state.

In some embodiments, the method further comprises emitting the carbohydrate solution, as the aerosol suspension of particles, onto a second panel that includes a flavor agent such that the carbohydrate solution is infused with a particular flavor or aroma of the flavor agent. In other embodiments, the method further comprises inputting a carbohydrate supply into an intake compartment and producing the carbohydrate solution from the carbohydrate supply. In some embodiments, the carbohydrate solution is produced by a processing mechanism coupled to the compartment. In some embodiments, the method further comprises measuring one or more of the following a sugar content of the carbohydrate solution, a pH level of the carbohydrate solution, and an alcohol level of the carbohydrate solution. In some embodiments, the method further comprises dissolving a gas into the carbohydrate solution.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular alcoholic beverages. However, it should be noted that the techniques of the present disclosure apply to various other alcoholic and non-alcoholic beverages. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments of the present disclosure, devices and methods for rapid fermentation are provided. In certain embodiments, a juice or other liquid containing sugars, is may be fermented into a alcoholic or non-alcoholic beverage. Some embodiments of the device include a container for housing a carbohydrate solution, such as grape juice. The carbohydrate solution may also comprise a wort created from wheat, barley, or other grain. In other embodiments, a processor is included that extracts the carbohydrate solution from a carbohydrate supply, such as grapes or other fruit. Time grape juice is then converted into an aerosol suspension of particles by an atomizer. The juice is emitted as an aerosol onto a panel that includes a fermentation agent comprising a culture of microorganisms, such as yeast, that ferments the juice by consuming sugars in the juice and converts it into alcohol and carbon dioxide. The rate of fermentation is increased by the increased surface area of the juice in an aerosol form, as well as by the rapid emission of juice onto the panel of yeast. The panel may also utilize various mediums and increased surface area for supporting healthy growth of yeast colonies. The juice continues to be emitted and passed through the panel of yeast until the juice has been fermented to a desired state.

Additional panels containing flavor agents, such as wood particles, may be utilized to infuse the wine with particular flavors and/or aromas. Further embodiments of the present disclosure include devices and mechanisms for, measuring the sugar content, acidity, and/or alcohol content of the carbohydrate solution in order to achieve desired fermentation properties. Temperature regulation, aeration, and/or carbonation mechanisms provide for achievement of additional desired characteristics.

Certain embodiments of the present disclosure include a user input is configured to receive user input corresponding to various characteristics of the carbohydrate solution, including temperature for fermentation, time of fermentation, style of wine, type of fermentation agent, etc. A programmable system controller that controls operation of various components and/or elements of the device based on the user input. The programmable system controller may also be configured to control operation of the device by retrieving predetermined times, temperatures, and other characteristics of fermentation from one or more sources, including local storage in memory and/or global databases accessed through a global network via a wireless interface.

Example Embodiments

Figure 1:
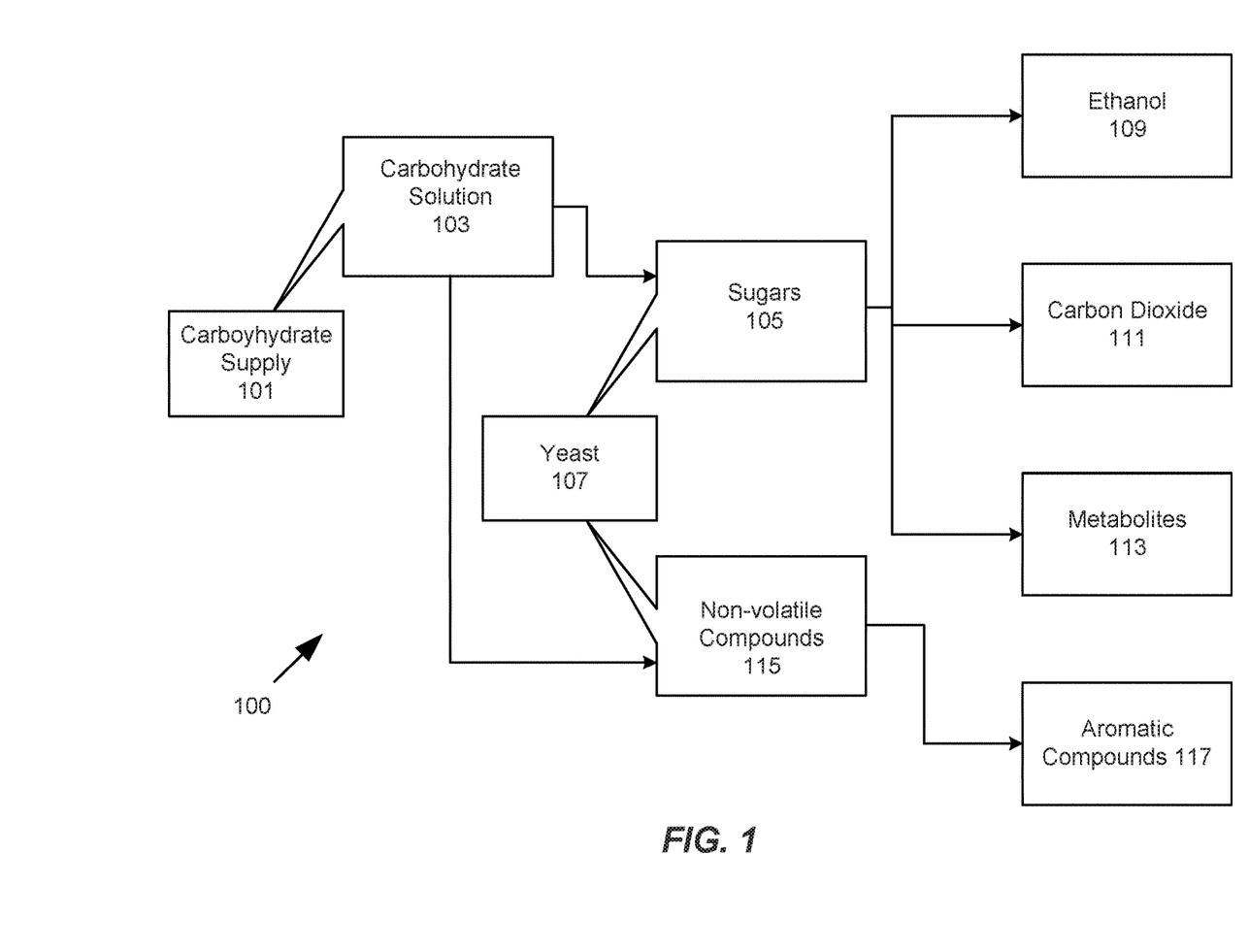
FIG. 1 is a flow diagram illustrating the general concept of alcohol fermentation, in accordance with one or more embodiments.

FIG. 1 is a flow diagram illustrating the general concept of alcohol fermentation, in accordance with one or more embodiments. This figure describes an example process 100 whereby sugars 105 in a carbohydrate solution 103 derived from a carbohydrate supply 101 is metabolized by yeast cells 107 into ethanol 109, carbon dioxide 111, and other metabolites 113 and aromatic compounds 115. In some embodiments, carbohydrate supply 101 is a combination of one or more fruits, such as grapes, apples, apricots, peaches, pears, persimmons, pineapple, plums, watermelon, etc. In some embodiments, the carbohydrate solution 103 is a fruit juice extracted such fruits, such as grape juice. In some embodiments, sugars 105 include natural sugars occurring in a fruit, such as grapes, such as glucose and fructose. In other embodiments, sugars 105 may include other added sugars from sources such as cane sugar, corn sugar, beet sugar, brown sugar, rice sugar, powdered malt, etc. These sugars 105 provide a source of glucose that yeast 107 metabolizes through alcohol fermentation, a process by which glucose is metabolized into ethanol 109 and carbon dioxide 111. Yeast cells 107 may comprise one or more strains of yeast, including genetically modified strains. Alcohol fermentation is an anaerobic fermentation process that involves an enzymatic pathway requiring 12 enzymes. Anaerobic fermentation of a juice, such as grape juice, may produce an alcoholic wine or other beverage. In some embodiments, alcohol fermentation by yeast 107 may also result in various metabolites 113, such as acids, alcohols, carbonyls, esters, sulfur compounds, etc. In some embodiments, the carbohydrate solution 103 may include other non-volatile compounds 115, such as glycosides, cys-thiols, and glutathione, that may be converted into various aromatic compounds 117, including terpenes, thiols, etc. As will be described below, some or all of the previously described processes may occur in a rapid fermentation system, such as system 200, and/or rapid fermentation device, such as device 300.

Figure 2:
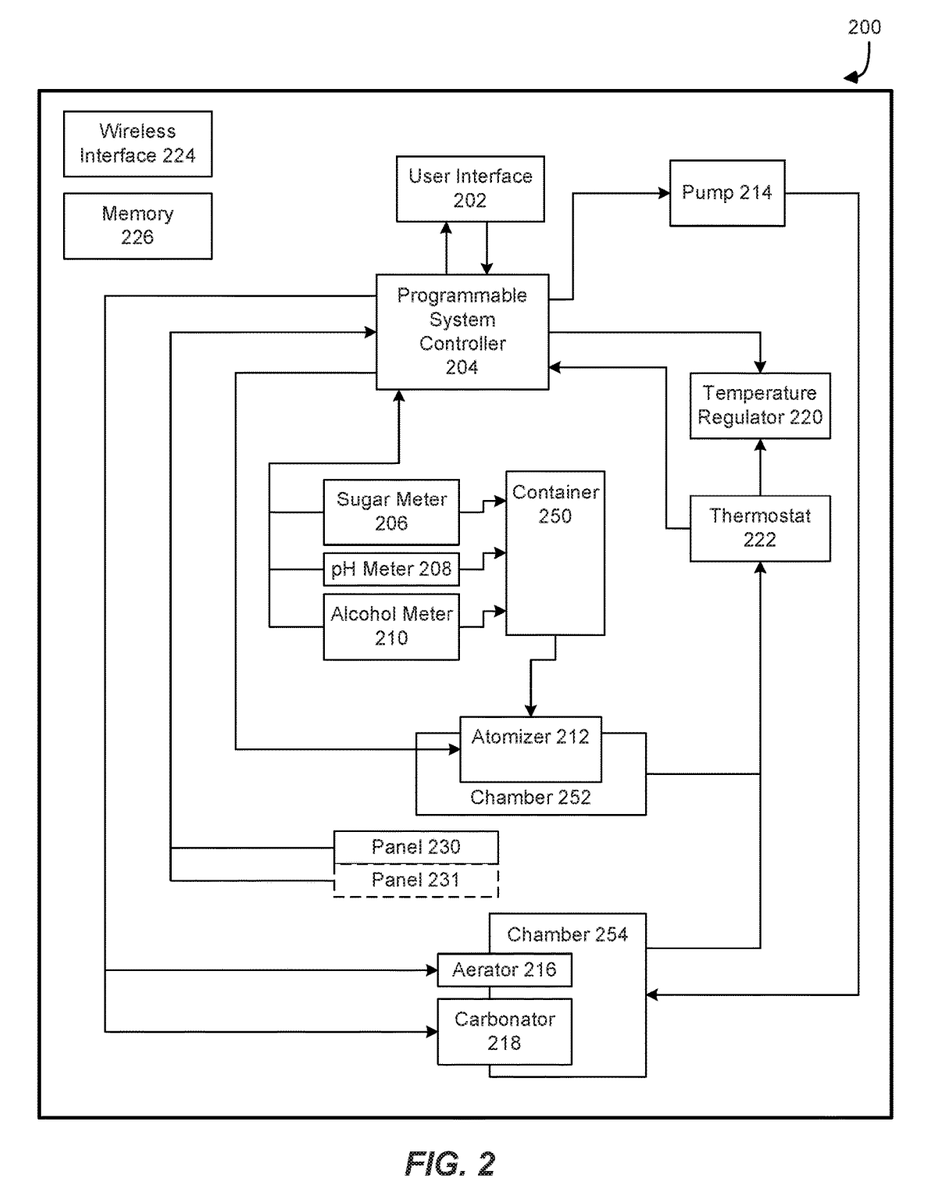
FIG. 2 illustrates an example of a system for rapid fermentation, in accordance with one or more embodiments.

FIG. 2 illustrates an example of a system 200 for rapid fermentation, in accordance with one or more embodiments. In some embodiments, system 200 is a system for rapid fermentation of a juice to an alcoholic beverage. In some embodiments, system 200 includes user interface 202, programmable system controller 204, pH meter 206, sugar meter 208, alcohol meter 210, atomizer 212, aerator 216, carbonator 218, temperature regulator 220, thermostat 222, wireless interface 224, memory 226, container 250, chamber 252, and chamber 254.

In some embodiments, a user may enter inputs at user interface 202. In various embodiments, inputs may include desired alcohol level, wine type, desired flavors, fermentation time, fermentation temperature, etc. For example, a user may input a desired alcohol content of 15% alcohol by volume. In other embodiments, the input may include other desired attributes corresponding to the beverage. For example, a user input may input whether carbonation is desired in the beverage. In other embodiments, a user may input controls to initiate, terminate, and/or alter operation of one or more elements and/or components of device 300. In some embodiments, the user interface 202 includes buttons, a keypad, a mouse, or a touchscreen for receiving user input. In some embodiments, user interface 202 interacts with wireless interface 224 in order to receive the user input wirelessly via an electronic user device. For example, user interface 202 may receive user input from a user's personal computer, or the user's personal cell phone or other portable handheld device.

In some embodiments, user interface 202 communicates such inputs to programmable system controller 204. In particular embodiments, programmable system controller 204 includes a processor, memory, and/or an interface for communicating with various device elements and/or components. In some embodiments, programmable system controller 204 receives information from a source based on the user input received. In some embodiments, the source is local storage, such as memory 226. In some embodiments, memory 226 stores data associated with fermented beverages, such as wine styles, alcohol types, data on yeast cultures or other microorganisms, fermentation methods, etc. In other embodiments, memory 226 stores data and program instructions for controlling programmable system controller 204 to receive the user input, receive information from various sources, and/or controlling various device elements and/or components. In some embodiments, memory 226 may be memory 503, as further described in FIG. 5. In other embodiments, the source may is one or more global databases, such as a server, accessed through a global network, such as the Internet. In some embodiments, one or more global networks is be accessed by wireless interface 224, which may be configured to send and receive data packets or data segments over a global network, such as the Internet. In some embodiments, data received through wireless interface 224 is stored in memory 226 for processing by programmable system controller 204. In some embodiments, wireless interface 224 may be interface 511, as further described in FIG. 5.

In various embodiments, programmable system controller 204 controls the operation of the various elements and/or components of system 200, including atomizer 212, pump 214, aerator 216, carbonator 218, and/or temperature regulator 220. In other embodiments, programmable system controller 204 receives measurements and/or other status information from various elements and/or components of system 200, including pH meter 206, sugar meter 208, alcohol meter 210, and thermostat 222. In some embodiments, programmable system controller 204 controls various elements and/or components of system 200 based on the received user input. In embodiments, programmable system controller 204 controls operation of the various elements and/or components of device 200 based on information received from one or more sources. In further embodiments, programmable system controller 204 controls operation of the various elements and/or components based on determinations made from the received information. In various embodiments, programmable system controller 204 includes memory and one or more processors. An example of a programmable system controller 204 is further described in FIG. 5.

In some embodiments, a carbohydrate source is housed in container 250. In some embodiments the carbohydrate source is a juice from a fruit and/or vegetable. For example, the carbohydrate source may be apple juice, grape juice, etc. In other embodiments, the carbohydrate source is a wort or other liquid extracted from wheat, barley, or other grain. In certain embodiments, the carbohydrate source also includes any one of various herbs or spices including, but not limited to, nettle leaf, chamomile, ginger, peppermint, lavender, etc.

As depicted in FIG. 2, container 250 is coupled to sugar meter 206, pH meter 208, and/or alcohol meter 210 such that each meter includes at least a sensor mechanism configured to measure the carbohydrate solution within container 250. In some embodiments, sugar meter 206, pH meter 208, and/or alcohol meter 210 are similarly coupled to other structures of system 200, such as chamber 252 and/or chamber 254 in order to measure the carbohydrate solution within such structures. In some embodiments, sugar meter 206 measures the sugar content of the carbohydrate source, as further described below at 306 in FIG. 3. In some embodiments, sugar meter 206 relays its measurement to programmable system controller 204 and the sugar content is displayed at user interface 202. In some embodiments, pH meter 208 measures the acidity of the carbohydrate source in container 250, as further described below at 308 in FIG. 3. In some embodiments, pH meter 208 relays the pH measurement to programmable system controller 204 and the pH measurement is displayed at user interface 202. In some embodiments, alcohol meter 210 measures the alcohol content of the carbohydrate source, as further described below at 310 in FIG. 3. In some embodiments, alcohol meter 210 relays its measurement to programmable system controller 204 and the alcohol content is displayed at user interface 202.

Figure 3A:
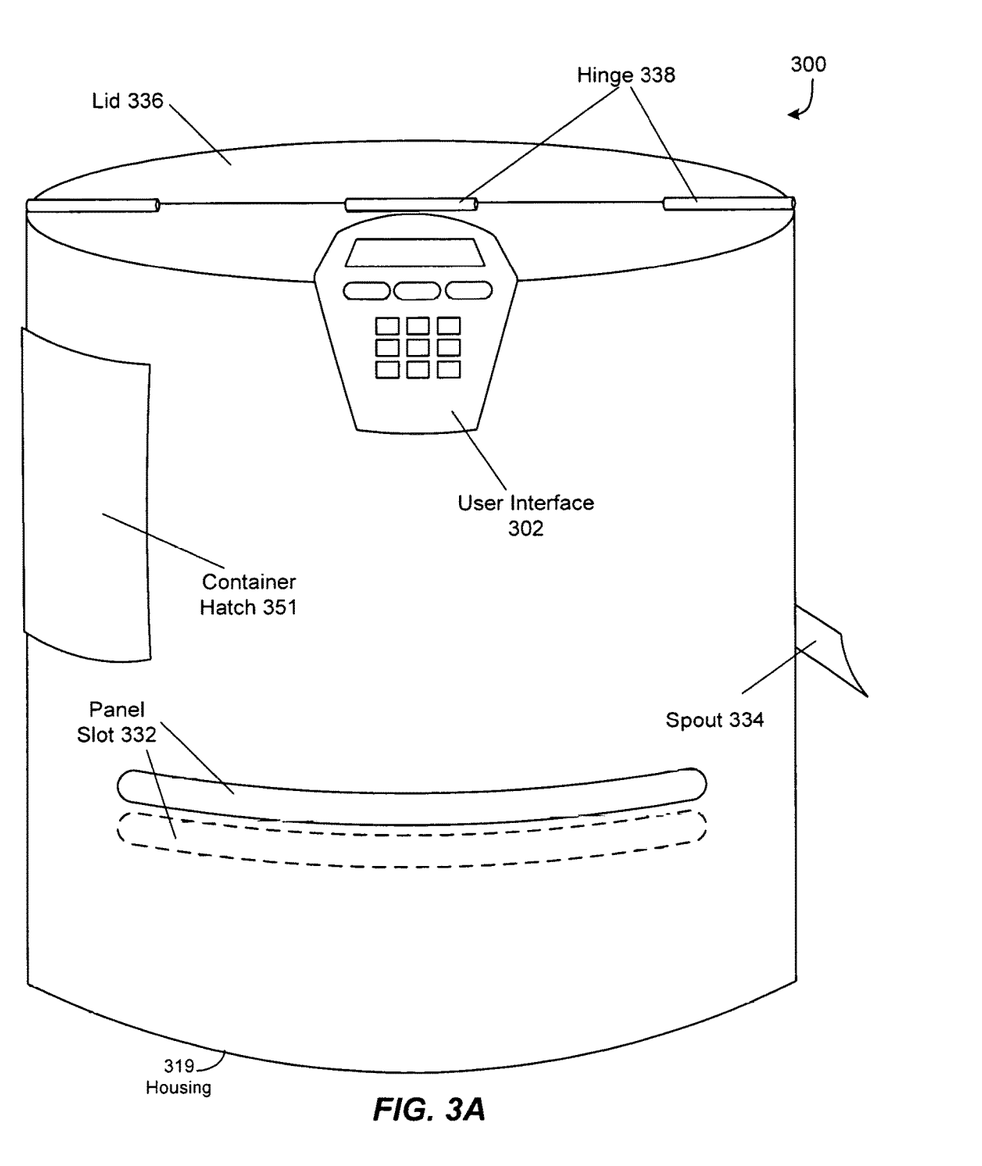
FIG. 3A illustrates an exterior view of a device for rapid fermentation, in accordance with one or more embodiments.
Figure 3B:
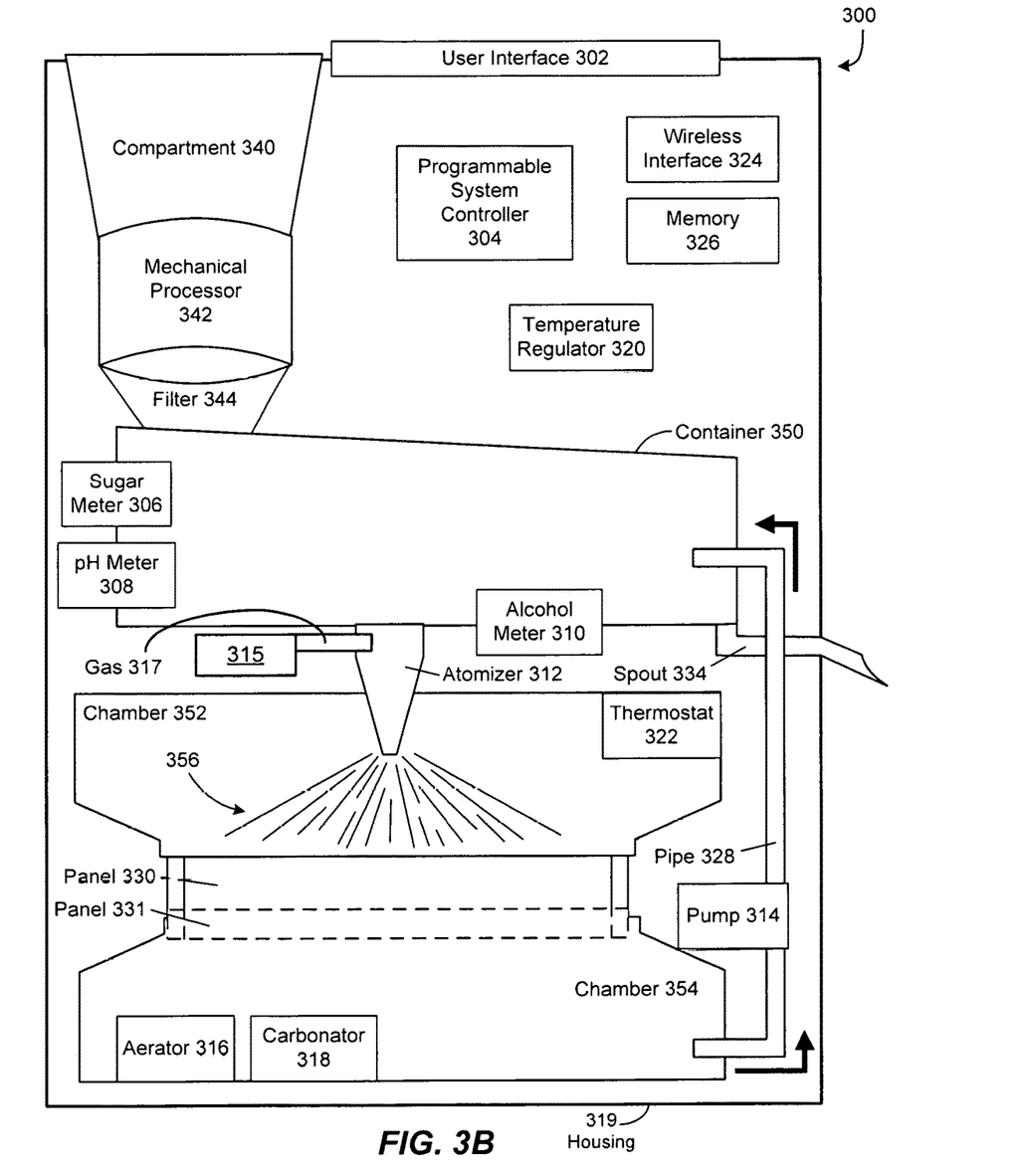
FIG. 3B illustrates an interior view of a device for rapid fermentation, in accordance with one or more embodiments.

In some embodiments, the carbohydrate source from container 250 is directed to atomizer 212. In some embodiments, atomizer 212 converts the carbohydrate source into an aerosol suspension of particles, which are then emitted into chamber 252. In some embodiments, the aerosol suspension comprises a mist. In some embodiments, atomizer 212 is coupled to chamber 252. In other embodiments, atomizer 212 may be located outside of chamber 252, but may include an output nozzle that directs the aerosol suspension of particles into chamber 252. In some embodiments, the operation of atomizer 212 is controlled by programmable system controller 204.

In various embodiments, atomizer 212 emits the aerosol suspension of particles onto one or more panels, such as panels 230 and 231. In some embodiments, the aerosol suspension of particles is emitted onto multiple panels at a time. In other embodiments, the aerosol suspension of particles is emitted onto one panel at a time. In some embodiments, panel 230 and panel 231 are utilized in system 200 one at a time. In some embodiments a panel, such as panel 230, includes a yeast culture, such as yeast 107, or other microorganisms that are able to ferment sugars, such as sugar 105, into carbon dioxide, such as carbon dioxide 111, and alcohol, including ethanol 109. As the aerosol suspension of particles of carbohydrate solution contact panel 230, the yeast cultures and/or other microorganisms begin to ferment the carbohydrate solution. In some embodiments, a yeast culture will ferment a juice, such a grape juice, into wine. Other panels, such as panel 231, may include a flavor agent. Such flavor agents include natural and/or artificial substances and may include wood particles, nuts, fruit rinds, mushrooms, etc. Such flavor agents cause the carbohydrate solution to be infused with a particular flavor and/or aroma provided by the flavor agent. Panels, such as panel 230 and panel 231 are further described in FIG. 3 below.

In some embodiments panel 230 and panel 231 relay status information to programmable system controller 204. Such status information may include operation time corresponding to the amount of time a panel 230 and/or 231 has been used in the operation of system 200. In other embodiments, the status information includes an estimated expiration time to replace panel 230 and/or 231. In other embodiments, the status information includes information of the material or substance contained in the panel, such as a yeast culture, other microorganism, or flavor agent. In some embodiments, such status information is displayed at user interface 202.

In various embodiments, the carbohydrate solution is collected in chamber 254 after passing through panel 230 and/or panel 231. In some embodiments, the aerosol suspension of particles may condense into liquid form in chamber 254 and/or within panels 230 and 231, in some embodiments, pump 214 causes the collected carbohydrate solution to be pumped back to container 250 and/or atomizer 212. In some embodiments, programmable system controller 204 initiates and/or terminates operation of pump 214. In some embodiments, the carbohydrate solution is pumped into a pipe structure through an intake aperture and out an exit aperture back into container 250. In some embodiments, the pipe structure is coupled to chamber 254 and container 250. In some embodiments the carbohydrate solution is pumped directly to atomizer 212.

In some embodiments, chamber 254 is coupled to aerator 216 for circulating air through the carbohydrate solution. In further embodiments, chamber 254 is coupled to carbonator 218 for dissolving carbon dioxide into the carbohydrate solution. In some embodiments, programmable system controller 204 initiates and/or terminates operation of aerator 216 and/or carbonator 218. In various embodiments, aerator 216 and/or carbonator 218 are coupled to other sections and/or components of system 200, such as container 250 and/or chamber 254.

In some embodiments, system 200 includes temperature regulator 220. In certain embodiments, temperature regulator 220 controls the temperature of the carbohydrate solution by heating or cooling the carbohydrate solution to maintain a predetermined temperature. In some embodiments, temperature regulator 220 heats and/or cools container 250, chamber 252, and/or chamber 254. In some embodiments, temperature regulator 220 includes a heating element that transforms electrical energy into heat. In other embodiments temperature regulator 220 includes a thermoelectric cooling mechanism or Peltier mechanism. In some embodiments, the thermoelectric cooling mechanism and heating element may work in conjunction to adjust the temperature in one or more sections of device 300. In some embodiments, programmable system controller 204 may update and/or set temperature regulator 220 with a predetermined temperature. As previously described, in some embodiments, input received from user interface 202 may include a predetermined temperature for fermentation. Furthermore, a predetermined temperature may be received by the programmable system controller 204 from one or more sources, and/or determined by the programmable system controller 204. For example, information received from one or more sources may include one or more suggested temperatures for fermentation by particular yeast or other microorganisms.

In some embodiments, system 200 includes thermostat 222. In some embodiments, thermostat 222 includes one or more sensors to measure the temperature of the carbohydrate solution in container 250, chamber 252, and/or chamber 254. In some embodiments, thermostat 222 relays the measured temperature to programmable system controller 204 and the temperature is displayed at user interface 202. In some embodiments thermostat 222 relays the measured temperature to temperature regulator 220. Based on the measured temperature, temperature regulator 220 may begin heating or cooling to achieve the predetermined temperature. In some embodiments, thermostat 222 may directly cause temperature regulator 220 to adjust and/or maintain the temperature. In other embodiments, programmable system controller 204 controls operation of temperature regulator 220 based on the thermostat 222 measurements. In some embodiments, temperature measurements from thermostat 222 may cause programmable system controller 204 to begin or end operation of other system components and/or elements.

For example, based on an input of a desired wine style and juice type, the programmable system controller may receive from local storage an optimal suggested time temperature to ferment the juice. As another example, based on the input, the programmable system controller may receive one or more optimal suggested fermentation times and temperatures from various global databases. Such information may be ranked based on keyword, prior usage, ranking by third parties, etc. In some embodiments, the programmable system controller may determine a fermentation time and temperature based on the received information. In another embodiment, the programmable system controller may determine a fermentation time and temperature by presenting a user with the received information and prompting the user to select a desired time and temperature to ferment the juice. In such embodiments, the programmable system controller may use the received and/or determined information to control various elements and/or components of system 200, such as temperature regulator 220. In some embodiments, system 200 accesses the global network via wireless technology, e.g. Bluetooth or WiFi technology.

FIG. 3A and FIG. 3B illustrate examples of a device 300 for rapid fermentation, in accordance with one or more embodiments. Device 300 is an example depiction of one embodiment of a device for rapid fermentation. Thus, the components of device 300 are not necessarily drawn to scale. In some embodiments, device 300 may include all or some of the components of system 200. FIG. 3A depicts an exterior view of device 300. FIG. 3B depicts an interior view of device 300. According to various embodiments, device 300 includes user interface 302, programmable system controller 304, sugar meter 306, pH meter 308, alcohol meter 310, atomizer 312, pump 314, aerator 316, carbonator 318, a housing 319, temperature regulator 320, thermostat 322, wireless interface 324, memory 326, pipe 328, panel 330, panel 331, panel slot(s) 332, spout 334, lid 336, hinges 338, compartment 340, mechanical processor 342, filter 344, container 350, container hatch 351, chamber 352, chamber 354, and aerosol particles 356.

According to various embodiments, device 300 may be used to ferment a carbohydrate solution into a particular beverage or other state. In various embodiments, such beverage may be alcoholic or non-alcoholic. For example, device 300 can be used to ferment grape juice into a wine. In various embodiments, device 300 includes user interface 302 for receiving user input. In some embodiments, user interface 302 may be user interface 202, and may be used to enter the same or similar inputs as previously described in FIG. 2. In some embodiments, user interface 302 includes one or more buttons and/or display screens as depicted in FIG. 3A. In other embodiments, user interface 302 includes a touchscreen. As previously described, a user may use user interface 302 to enter inputs corresponding to certain desired properties of the carbohydrate solution, such as juice, wine, etc. For example, a user may input a desired sugar content, alcohol content, and/or acidity level. In other embodiments, a user may also input operational actions for various components and/or elements of device 300 that are further described below. For example, a user may also input a predetermined time of operation or desired temperature for fermentation.

A user may also use user interface 302 to select stored operation programs or retrieve information corresponding to fermentation of juices or other carbohydrate solutions. In some embodiments, such programs and information are stored in memory 326. In some embodiments memory 326 may be memory 226. As previously described, certain embodiments of memory 326 store data and program instructions for controlling a programmable system controller, such as programmable system controller 304, to receive the user input, receive information from various sources, and/or controlling various device elements and/or components. In some embodiments, programmable system controller 304 may be programmable system controller 204.

Further embodiments of device 300 include wireless interface 324. In some embodiments, wireless interface 324 may be wireless interface 224. In some embodiments, wireless interface 324 is configured to retrieve data and information from one or more sources, such as global databases accessed through a global network. In other embodiments wireless interface 324 is configured to receive user input from a user device, such as a personal computer. In other embodiments, wireless interface 324 is configured to receive status information from one or more components and/or elements of device 300. In other embodiments, wireless interface 324 is configured to transmit operational instructions to one or more components and/or elements of device 300.

A carbohydrate solution, such as grape juice, is housed in container 350. In some embodiments, the carbohydrate solution may be various other types of fruit juice, such as apple juice, pear juice, etc. In other embodiments, the carbohydrate solution may be wort made from barley or other grain. Such carbohydrate solutions may be poured directly into container 350. In other embodiments, device 300 may be configured to intake a carbohydrate supply, such as carbohydrate supply 101, and extract a carbohydrate solution, such as carbohydrate solution 103. For example, a carbohydrate supply is input into a compartment 340. In various embodiments, the carbohydrate supply may be a fruit, such as grapes, apples, apricots, peaches, pears, persimmons, pineapple, plums, watermelon, etc. The carbohydrate supply may also include various types of berries, such as blackberries, blueberries, currents, elderberries, gooseberries, raspberries, strawberries, etc. In certain embodiments, device 300 includes a lid 336 (shown in FIG. 3A) which can open and close by pivoting on a hinge mechanism, such as hinges 338, to allow access to compartment 340.

In some embodiments, a mechanical processor 342 is coupled to compartment 340 and is configured to extract the juices within the fruit input into compartment 340. In some embodiments, mechanical processor 342 includes a motorized arrangement for extracting juice from a fruit, including, but not limited to, a hydraulic press mechanism, a single auger mechanism, and/or a centrifugal juicing mechanism. In some embodiments, processor 342 separates the juice from any pulp and other plant material. In some embodiments filter 344 separates the juice by allowing only the extracted juice to drain into container 350. In other embodiments some pulp or plant material is also collected in container 350, along with the extracted juice.

In various embodiments, container 350 is coupled to sugar meter 306, pH meter 308, and alcohol meter 310. In some embodiments, sugar meter 306, pH meter 308, and/or alcohol meter 310 are located outside of container 350 and include sensors that contact the inside surface of container 350 to measure various characteristics of a carbohydrate solution contained within. In other embodiments, sugar meter 306, pH meter 308, and/or alcohol meter 310 may be located in other locations within device 300 and/or coupled to other components or elements of device 300. For example, sugar meter 306, pH meter 308, and/or alcohol meter 310 may include sensors that contact the inside surfaces of chamber 352 and/or 354.

In some embodiments, sugar meter 306 may be sugar meter 206. Sugar meter 306 includes various mechanical and/or electrical arrangements for measuring the sugar content of the carbohydrate solution in container 350. In some embodiments sugar meter 306 includes a hydrometer with a floating weight. In other embodiments sugar meter 306 includes a refractometer which may utilize a laser to measure the index of refraction of the carbohydrate solution. In some embodiments, sugar meter 306 provides the percentage Brix of the carbohydrate solution corresponding to the relative weight of the sugar in a solution compared to distilled water. For example, 22 Brix equals 22 grams of sugar in 78 grams of water.

In fermenting a juice into wine or other alcoholic beverage, it may be desired to include a certain amount of sugars in the carbohydrate solution before fermentation begins. Fermentation occurs when yeast or other microorganism consumes the available sugars in a carbohydrate solution and turns that sugar into approximately half alcohol and half carbon dioxide gas by weight. The amount of sugar within the carbohydrate solution will affect the final amount of alcohol in the beverage. In winemaking, the alcohol concentration of the finished wine is estimated to be 0.55 times the Brix of a grape juice. The amount of sugar within the carbohydrate solution may also affect the final taste and/or flavor of a wine.

As previously described in FIG. 2, the readings from sugar meter 306 may be displayed at a user interface, such as user interface 302. Based on this measurement, a user may adjust the sugar level of the carbohydrate solution by adding sugar or water to the carbohydrate solution in container 350. In certain embodiments, various types of sugars may be added, such as cane sugar, corn sugar, beet sugar, brown sugar, rice sugar, fructose, powdered malt, etc. In other embodiments, other types of sugars may be added. Different sugar types can add unique flavor characters to the fermented wine. In some embodiments, honey can be used as a sugar source, which may add an herbal flavor characteristic to a fermented wine.

In some embodiments, pH meter 308 may be pH meter 208. The pH meter 308 measures the hydrogen-ion concentration of the carbohydrate solution in container 350, indicating the acidity and/or alkalinity of the carbohydrate solution. In various embodiments, pH meter 308 includes a glass electrode, a calomel reference electrode, and/or a combination electrode to measure differences in electrical potential. In fermenting a juice into wine or other alcoholic beverage, it may be important to have the proper amount of acidity in the juice in order to enhance the wine's overall character and balance, as well as significantly aid in the fermentation process. A wine with too much acid may tastes sharp, sour, and/or bitter. A wine without enough acid may taste flat, bland, and/or lifeless. As previously described in FIG. 2, the readings from pH meter 308 may be displayed at a user interface, such as user interface 302. Based on this measurement, a user may adjust the acidity of the carbohydrate solution by adding an acid, such as tartaric acid, citric acid, and/or malic acid, to the carbohydrate solution in container 350. In some embodiments, such acids may come in a granulated form to be dissolved in the carbohydrate solution.

In some embodiments, alcohol meter 310 may be alcohol meter 210. Alcohol meter 310 measures the alcohol content of the carbohydrate solution. In some embodiments, alcohol meter 310 includes an anode and cathode arrangement that oxidizes ethanol to acetic acid at the anode. In certain embodiments, alcohol meter 310 vaporizes samples of the carbohydrate solution to release the ethanol to be oxidized at the anode. The electric current produced by the oxidation reaction is measured by a microprocessor as an approximation of overall alcohol content of the carbohydrate solution. In other embodiments, alcohol meter 310 measures the alcohol level of vapors released within container 350. As previously described in FIG. 2, the readings from alcohol meter 310 may be displayed at a user interface, such as user interface 302. In some embodiments, the alcohol content may be calculated by the sugar content measured by the sugar meter 306 at certain points in time and comparing the measurements to the initial sugar content measurement, the alcohol content can be estimated from the difference in sugar levels measured by sugar meter 306.

Once the pH level and sugar content of the carbohydrate solution has been adjusted to desired levels, atomizer 312 converts the carbohydrate solution into an aerosol suspension 356 of particles. In some embodiments, the aerosol suspension 356 may range from a fast spray to a fine mist. In various embodiments, atomizer 312 may utilize various different mechanisms to create the aerosol suspension of carbohydrate solution. In some embodiments, atomizer 312 includes an aspirator nozzle mechanism that is configured to produce a fine spray of liquid based on the Venturi effect. In such embodiments, atomizer 312 further includes a pressure mechanism 315 for automatically causing a fast stream of gas 317 to break up the liquid into fine droplets. In other embodiments, atomizer 312 includes a source of propellant under pressure that causes the carbohydrate solution out of a small opening to emerge as an aerosol 356 or mist. As propellant expands to drive out the carbohydrate solution, only some propellant evaporates to maintain a constant pressure. Outside the atomizer, the droplets of propellant may evaporate rapidly, leaving the carbohydrate solution suspended as an aerosol suspension 356 of very fine particles or droplets. Other embodiments of atomizer 312 include variously shaped spray nozzles to break up the carbohydrate solution into droplets. In some embodiments, atomizer 312 is a rotary atomizer that utilizes a high speed rotating disk, cup, and/or or wheel to discharge the carbohydrate solution at high speed to the perimeter, forming a hollow cone spray. In other embodiments, atomizer 312 is an ultrasonic atomizer that utilizes high frequency (20-180 kHz) vibration to produce narrow drop-size distribution and low velocity spray from a liquid. In such embodiments, the vibration of a piezoelectric crystal causes capillary waves on the nozzle surface liquid film. In further embodiments, atomizer 312 includes an electrospray mechanism that employs electricity to disperse the carbohydrate solution into the aerosol suspension.

In some embodiments, the nozzle opening of atomizer 312 emits the carbohydrate solution as an aerosol suspension 356 into chamber 352 and onto panel 330. Chamber 352 is separated from chamber 354 by panel 330. In some embodiments, panel 330 is inserted and ejected through panel slot 332 (shown in FIG. 3A) in housing 319. In some embodiments, panel 330 may be panel 230, and includes a fermentation agent. In some embodiments, panel slot 332 may be panel slots 332. In some embodiments, the fermentation agent is a culture of yeast, such as yeast 107, or other microorganisms. Such microorganisms include, but are not limited to, suitable winemaking or beer making yeasts. In other embodiments, panel 330 includes other microorganisms that ferment sugars into acids, gases, and/or alcohol. In some embodiments, panel 330 comprises a porous medium allowing the emitted carbohydrate solution to pass through panel 330 into chamber 354. Certain embodiments of panel 330 include one or more mesh structures that are configured in layers. Openings in such mesh structures may range from 2 to 200 microns. Other embodiments of panel 330 include a porous gel or agar suitable for maintaining yeast cultures and/or culture growth. In some embodiments the gel and/or agar is geometrically shaped (for example, honeycomb shaped) to increase surface area for increased capacity for the yeast culture. In other embodiments, panel 330 includes cylindrical growth of yeast colonies arranged in various patterns. In some embodiments, the cylindrical colonies range from 1 mm to 6 mm, or longer.

In various embodiments, the yeast (or other microorganism) culture begins fermentation of the carbohydrate solution as the aerosol suspension 356 of carbohydrate solution contacts panel 330. In general, wine fermentation (or fermentation of other beverages) occurs when yeast consumes sugar and converts in into alcohol and carbon dioxide gas. Typically, wine fermentation has two distinct stages: primary and secondary. These stages are sometimes described as aerobic and anaerobic fermentations, respectively. During the aerobic fermentation, the carbohydrate solution and/or yeast cultures are exposed to the open air. During this first stage, rapid fermentation activity can occur as yeast cells multiply. This stage can last 2-7 days. During the anaerobic fermentation, air exposure is kept at a minimum slowing down multiplication of yeast cells and increasing the rate of alcohol formation. The secondary fermentation can last between 1-2 weeks depending on the amount of nutrient and sugars available in the carbohydrate solution.

Figure 4A:
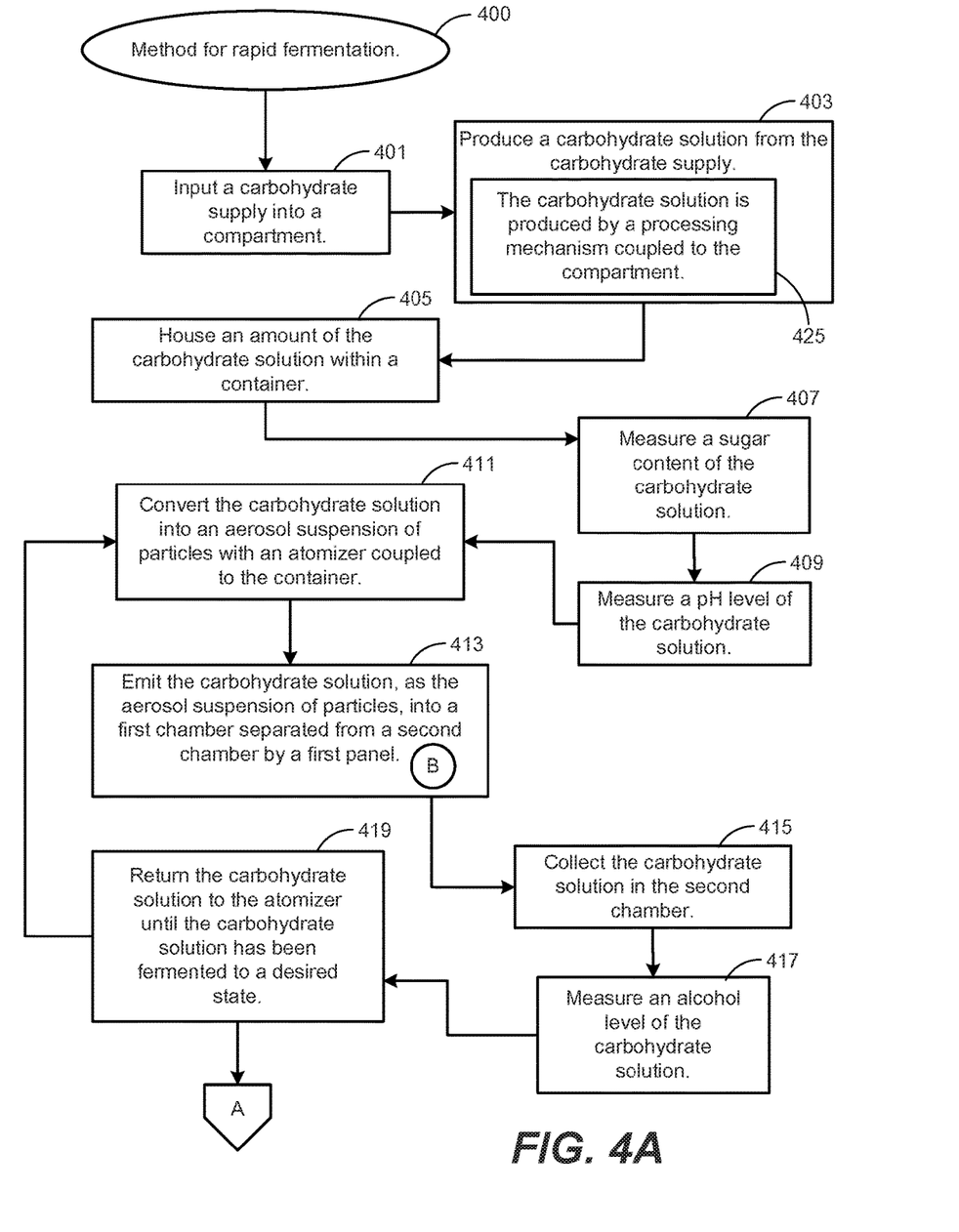
FIGS. 4A and 4B illustrate an example of a method for rapid fermentation, in accordance with one or more embodiments.

In some embodiments of the present disclosure, conversion of the carbohydrate solution into an aerosol suspension of particles increases the surface area of the carbohydrate solution that interacts with the yeast cells or other microorganisms on panel 330. In some embodiments, a porous gel or agar with a geometric shape for increasing surface area further increases the amount of yeast cells in contact with the carbohydrate solution. Furthermore, such geometric structure of panel 330 supports the rapid growth of yeast cells during the aerobic fermentation stage. Such factors can greatly increase the fermentation rate of the carbohydrate solution into an alcoholic beverage.

In certain embodiments, particular sections of device 300 can be sealed from and/or exposed to air depending on the desired stage of fermentation. For example, lid 336 may remain closed throughout the fermentation process. However, in some embodiments, lid 336 is lined with a seal made of rubber or other suitable material. In some embodiments, the seal is expanded mechanically to form an air tight seal, separating the interior of device 300 from the outside, when anaerobic fermentation is desired. As another example, each of container 350, chamber 352, and/or chamber 354 may include sealing mechanisms to form air tight seals in one or more of the structures.

As the carbohydrate solution pass through panel 330, the carbohydrate solution condenses and/or collects into a liquid in chamber 354. In some embodiments, the carbohydrate solution condenses and/or collects within the structure of panel 330 before entering chamber 354. In some embodiments, chambers 352 and 354 are pressurized such that the movement of the carbohydrate solution through panel 330 is accelerated. A higher pressure is created in chamber 352 while a lower pressure is created in 330. In some embodiments a pump mechanism may create the higher pressure in chamber 352 and/or the lower pressure in chamber 354. The lower net pressure created in chamber 354 may cause the carbohydrate solution to be sucked and/or forced through panel 330 in aerosol and/or liquid form.

As the carbohydrate solution is collected in chamber 354, it is returned to be converted into aerosol suspension 356 by atomizer 312. In some embodiments, the carbohydrate solution is returned to atomizer 312 by being pumped through pipe 328 into container 350. In some embodiments, pump 314 pumps the carbohydrate solution through pipe 328. In some embodiments, a filter lines the opening of pipe 328 at chamber 354 to separate the carbohydrate from sediment that may collect in chamber 354. The sediment that may form in chamber 354 may be a heterogeneous mixture that consists of a combination of one or more of the following: dead yeast cells, the insoluble fragments of fruit pulp and skin, and the fruit seeds that settle out of new wine. In some embodiments, pump 314 additionally and/or alternatively creates a lower net pressure in chamber 354, as described above. In some embodiments, pump 314 may be pump 214.

In various embodiments, temperature regulator 320 adjusts the temperature of one or more sections of device 300, including container 350, chamber 352, and/or chamber 354. In some embodiments, temperature regulator 320 is controls the operation of various heating and cooling mechanisms. In some embodiments, a heating mechanism comprises a heating element that transforms electrical energy into heat. In some embodiments a cooling mechanism comprises a thermoelectric cooling mechanism or Peltier device. In some embodiments, the thermoelectric cooling device and heating element may work in conjunction to adjust the temperature in one or more sections of device 300. As described in FIG. 2, temperature regulator 320 is programmed by system controller 304 to maintain a predetermined temperature. As shown in FIG. 3B, thermostat 322, coupled to chamber 352, measures the temperature within chamber 352. In some embodiments, the temperature measured by thermostat 322 is transmitted to programmable system controller 304. Based on the measured temperature, programmable system controller 304 initiates temperature regulator 320 to heat or cool device 300 to reach and/or maintain the predetermined temperature. In some embodiments, thermostat 322 communicates directly with temperature regulator 320 to imitate cooling and/or heating. In further embodiments, other thermostat devices may be located in other sections of device 300, including container 350 and chamber 354. In some embodiments, thermostat 322 includes sensors in various sections of device 300, including container 350, chamber 352, and/or chamber 354, in order to measure the temperature in such sections.

In winemaking, temperature can play an important role in the fermentation process. If the fermentation temperature is too cool, the yeast may not be invigorated enough to ferment. It will simply remain in the juice, dormant. If the fermentation temperature is too warm, the yeast may ferment fine or more rapidly, but the flavor of the wine will usually suffer from increased production of unwanted enzymes by the yeast and the possible growth of microorganisms that thrive in warmer temperatures. Temperatures around 120° F. may be too high and cause yeast cells to die.

In various embodiments, the optimum temperature for fermentation may vary depending on type of yeast, juice, fruit, etc. In various embodiments, the optimum temperature also may vary depending on style of wine to be produced. In some instances, fermentation produces heat and causes the temperature inside the device 300 to rise to unacceptable levels. High fermentation temperatures tend to drive off volatile aromatic compounds and increase alcohol concentrations through evaporation. Alcohol inhibition on yeast growth has a greater effect at high temperatures. Lower fermentation temperatures tend to retain fruit aromas and other volatile aromatics while maintaining a fuller mouth feel.

In other instances, after fermentation is complete, wine should be stored at a constant temperature until bottling or consumption. For example, red wines should be maintained around 68° F. or 20° C., while white wines should be maintained around 60° F. or 15° C. In some embodiments, temperature regulator 320 continues to maintain a desired temperature after the carbohydrate solution has been fermented to a desired state. As previously described in FIG. 2, a predetermined temperature may be determined by user input at user interface 302, by one or more recommended temperatures retrieved from one or more sources and/or memory 326, and/or by programmable system controller 304.

In some embodiments, alcohol meter 310 periodically measures the alcohol content of the carbohydrate solution as it is returned to container 350. In some embodiments, the alcohol content may be calculated by the sugar content measured by the sugar meter 306. By periodically taking sugar content measurements and comparing the measurements to the initial sugar content measurement, the alcohol content can be estimated from the difference in sugar levels.

In other embodiments, the carbohydrate is pumped through pipe 328 directly to atomizer 312 to be converted into aerosol suspension 356. In such embodiments, alcohol meter 310 may be located in chamber 354 to measure the alcohol content of the carbohydrate solution in chamber 354. In various embodiments, atomizer 312 and pump 314 operate until a desired alcohol content is achieved in the fermented carbohydrate solution. In other embodiments, atomizer 312 and pump 314 operate until some other desired characteristic of the fermented carbohydrate solution is achieved.

In various embodiments, a particular flavor and/or aroma may be desired in the fermented carbohydrate solution. In some embodiments, a desired flavor and/or aroma is infused into the carbohydrate solution by inserting a second panel 331 into device 300 through panel slot 332. In some embodiments, panel 330 is first ejected from device 300 before insertion of panel 331 into the same panel slot 332. In other embodiments, panel 331 may be inserted through a different panel slot 332. In some embodiments, panel 330 and panel 331 may be inserted in device 300 at the same time. In some embodiments, panel 331 may be panel 231, as described in FIG. 2 above. In certain embodiments, panel 331 includes one or more flavor agents. Such flavor agents include natural substances, such as wood particles, nut particles, fruit rinds, honey, etc. Other natural flavor agents may include the essential oil, oleoresin, essence or extractive, protein hydrolysate, distillate, or any product of roasting, heating or enzymolysis, which contains the flavoring constituents derived from a spice, fruit or fruit juice, vegetable or vegetable juice, edible yeast, herb, bark, bud, root, leaf or similar plant material, meat, seafood, poultry, eggs, dairy products, or fermentation products thereof, whose significant function in food is flavoring rather than nutritional. In other embodiments, flavor agents include artificial substances and/or flavorings. In various embodiments, panel 331 includes the same and/or similar structures as panel 330 as previously described.

Once panel 331 has been inserted and secured within device 300, operation of atomizer 312 and pump 314 initialize to cause the carbohydrate solution to be emitted as an aerosol onto panel 331. As the carbohydrate solution is passed through panel 331, such flavor agents cause the carbohydrate solution to be infused with a particular flavor and/or aroma provided by the flavor agent. In some embodiments, device 300 operates as such for a predetermined time.

After fermentation and/or flavoring are complete in certain embodiments pump 314 may stop to cause all of the carbohydrate solution to collect in chamber 354. In chamber 354, aerator 316 causes air and/or oxygen to mix with the fermented carbohydrate solution in order to aerate the liquid. In certain embodiments, mixing air, oxygen, and/or other gases can reduce particular unwanted or undesirable compounds, such as sulfites. In other embodiments aeration can also dull the flavor of ethanol created by fermentation. In other embodiments aeration can enhance desired flavors of the fermented carbohydrate solution.

In some embodiments, aerator 316 includes turbines or other structure to agitate the carbohydrate solution and cause air and/or other gases to mix with the carbohydrate solution. In other embodiments, aerator 316 bubbles air or other gases through the carbohydrate solution through diffusers, including air stones, fine bubble diffusers, coarse bubble diffusers, linear aeration tubing, etc. Other suitable mechanisms for mixing gas into liquid may be utilized in other embodiments. In various embodiments aerator 316 may pump in outside air to be used for aeration of the carbohydrate solution. In other embodiments aerator 316 includes a source of oxygen and/or other gas which is used to aerate the carbohydrate solution. In some embodiments, carbonator 318 is used to dissolve carbon dioxide into the carbohydrate solution under high pressure. In some embodiments, the dissolution of carbon dioxide into the carbohydrate solution will give the beverage an effervescent quality. In some embodiments, aerator 31 and carbonator 318 are combined into a single device that can diffuse a gas through the carbohydrate solution both under increased pressure and under normal atmospheric pressure. In some embodiments, the fermented carbohydrate solution is returned to container 350 via pump 314 and pipe 328 after aeration by aerator 316 and/or carbonation by carbonator 318.

In various embodiments, aeration by aerator 316 and carbonation by carbonator 318 may occur at any point in operation of device 300. For example, carbonation by carbonator 318 may occur before aeration by aerator 316. In some embodiments, aeration by aerator 316 occurs right before consumption of the fermented carbohydrate solution is desired. In various embodiments, aerator 316 and/or carbonator 318 may be coupled to and/or located within other structures and/or components of device 300. For example, in some embodiments the final fermented carbohydrate solution may be stored in container 350 until consumption is desired. Aerator 316 may be located within container 350 in order to aerate the fermented carbohydrate solution before it is released for consumption.

The final fermented carbohydrate solution is released from device 300 through spout 334. In some embodiments, aerator 316 is a Venturi mechanism coupled to spout 334 such that carbohydrate solution passes through the Venturi mechanism and is aerated as it exits device 300. In some embodiments, a pump mechanism, such as pump 314, assists in the exit of carbohydrate solution through spout 334 by increasing the pressure in container 350. In other embodiments, container 350 can be removed through container hatch 351 and the final fermented carbohydrate solution can be stored in container 350 outside of device 300 or poured out to be stored elsewhere.

FIG. 4A and FIG. 4B illustrate an example of a method 400 for rapid fermentation, in accordance with one or more embodiments. At step 401, a carbohydrate supply is input into a compartment. In some embodiments, the compartment is compartment 340. As previously described, the carbohydrate supply may be a fruit, such as grapes, apples, apricots, peaches, pears, persimmons, pineapple, plums, watermelon, etc. The carbohydrate supply may also include various types of berries, such as blackberries, blueberries, currents, elderberries, gooseberries, raspberries, strawberries, etc. In other embodiments, the carbohydrate supply may be various other types of fruit.

At step 403, a carbohydrate solution is produced from the carbohydrate supply. In some embodiments, the carbohydrate solution is the juice extracted from a fruit, such as grape juice. As previously described in FIG. 3, in some embodiments, the carbohydrate solution is produced by a processing mechanism 425 coupled to the compartment. In some embodiments, the processing mechanism 425 is mechanical processor 342 with a motorized arrangement for extracting juice from a fruit, including, but not limited to, a hydraulic press mechanism, a single auger mechanism, and/or a centrifugal juicing mechanism.

At step 405 an amount of the carbohydrate solution is housed within a container. In some embodiments, the container is container 350. In some embodiments, the carbohydrate solution passes through a filter, such as filter 344 to separate any pulp or other plant matter from the carbohydrate solution. In some embodiments, a carbohydrate solution may be directly input into the container at step 405, bypassing steps 401 and 403. For example, grape juice may be poured directly into the container without having to process grapes to extract juice from the grapes.

At step 407, a sugar content of the carbohydrate solution is measured. In some embodiments, the sugar content is measured by sugar meter 306. At step 409, a pH level of the carbohydrate solution is measured. In some embodiments, the pH level is measured by pH meter 308. In some embodiments, the sugar content and pH level are measured in the container. However, in other embodiments of method 400, the sugar content and pH level of the carbohydrate solution may be measured at other elements or components of a rapid fermentation device, such as chamber 352 or chamber 354. In certain embodiments steps 407 and/or 409 may occur at any point during method 400. In some of these embodiments, steps 407 and/or 409 may be constantly implemented during method 400 to provide a continuous measurement of the sugar content and/or pH level of the carbohydrate solution.

Figure 4B:
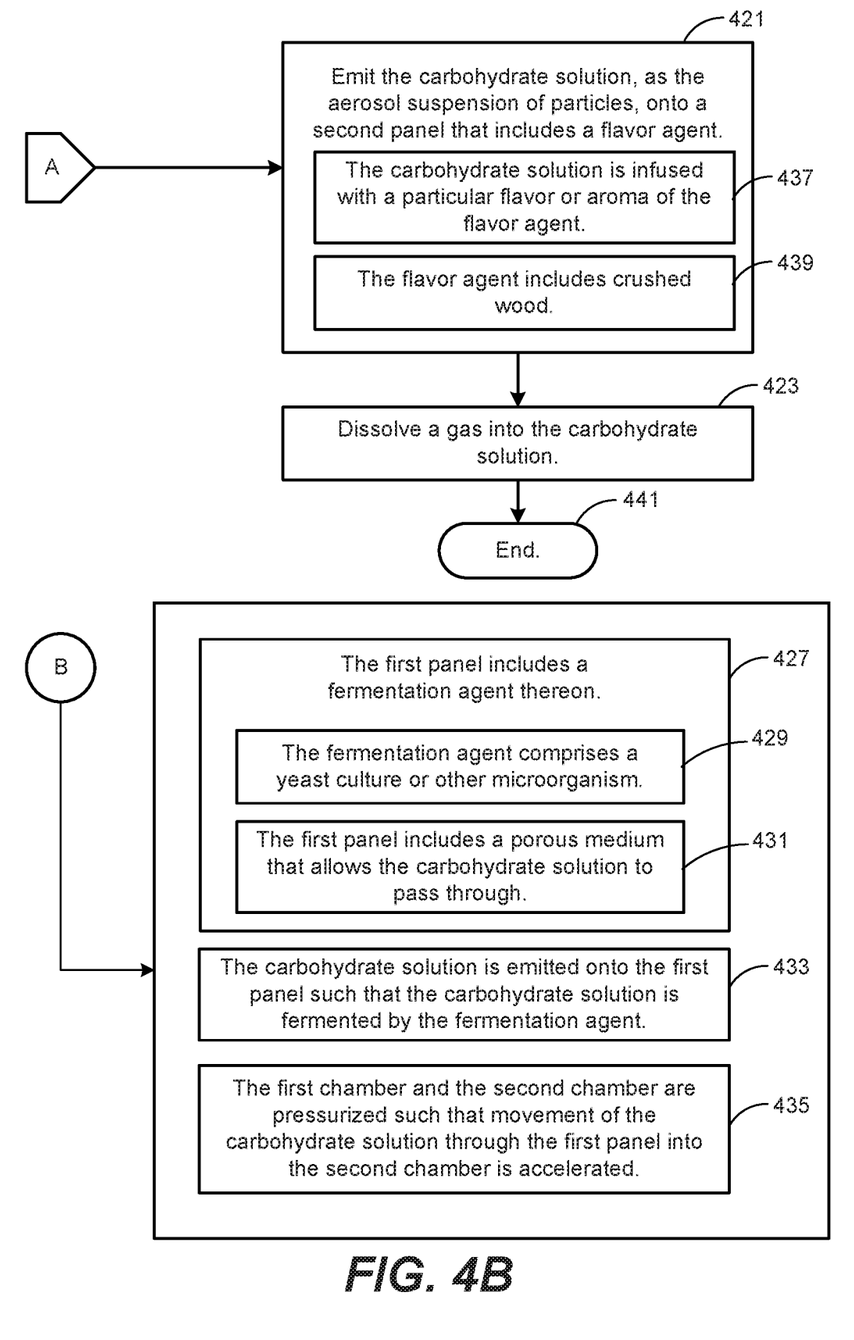

At step 411, the carbohydrate solution is converted into an aerosol suspension of particles with an atomizer coupled to the container. In some embodiments the atomizer is atomizer 312. At step 413, the carbohydrate solution is emitted, as the aerosol suspension of particles, into a first chamber separated from a second chamber by a first panel 427. In some embodiments, the first chamber is chamber 352 and the second chamber is 354. In some embodiments, the first panel 427 is panel 330. The first panel 427 includes a fermentation agent 429 thereon. The fermentation agent 429 comprises a yeast culture or other microorganism.

The carbohydrate solution is emitted onto the first panel such that the carbohydrate solution is fermented (433) by the fermentation agent 429. In some embodiments, the fermentation agent 429 comprises a yeast culture that consumes the sugars in the carbohydrate solution and converts it into alcohol and carbon dioxide. As previously described in FIGS. 3A and 3B, the first panel 427 includes a porous medium 431 that allows the carbohydrate solution to pass through. The first chamber and the second chamber are pressurized (435) such that movement of the carbohydrate solution through the first panel into the second chamber is accelerated. In some embodiments, a lower net pressure is created in the second chamber such that the higher pressure in the first chamber forces or pushes the carbohydrate solution through the first panel 427.

At step 415, the carbohydrate solution is collected in the second chamber. In some embodiments, the aerosol suspension of particles collects into a liquid form in the second chamber. In other embodiments, the aerosol suspension of particles collects in the first panel 427 and moves into the second chamber.

At step 417, an alcohol level of the carbohydrate solution is measured. In some embodiments, the alcohol level may be measured by alcohol meter 310. In other embodiments, the alcohol level may be measured by calculating the difference in sugar content measured at step 407 with a subsequent sugar content measurement. In some embodiments, the alcohol level may be measured at the second chamber. However, in other embodiments, of method 400, the alcohol level may be measured at other elements or components of a rapid fermentation device, such as container 350 or chamber 352. In certain embodiments step 417 may occur at any point during method 400. In some of these embodiments, steps 417 may be constantly implemented during method 400 to provide a continuous measurement of the alcohol level of the carbohydrate solution.

At step 419, the carbohydrate solution is returned to the atomizer until the carbohydrate solution has been fermented (433) to a desired state. In some embodiments, the carbohydrate solution is pumped through a pipe, such as pipe 328, by a pump, such as pump 314. In some embodiments, the carbohydrate solution is pumped back into the container. In other embodiments, the carbohydrate solution is pumped directly to the atomizer. The carbohydrate solution is then converted back into an aerosol suspension of particles at step 411 and emitted into the first chamber at step 413 to undergo fermentation (433). In some embodiments the desired state includes a predetermined alcohol level and/or sugar content of the carbohydrate solution. In other embodiments, the desired state may include various other desired characteristics of the carbohydrate solution.

Once the carbohydrate solution has been fermented (433) to the desired state, the carbohydrate solution is emitted, as an aerosol suspension of particles, onto a second panel that includes a flavor agent 439, at step 421. In some embodiments, the second panel is panel 331 previously described in FIGS. 3A and 3B. This causes the carbohydrate solution to be infused (437) with a particular flavor or aroma of the flavor agent. In some embodiments, the flavor agent 439 includes crushed wood. In some embodiments, the wood may be French Oak. In some embodiments, flavor agent 439 includes natural substances, such as wood particles, fruit rinds, nuts, or honey. In other embodiments, flavor agent 439 includes various other natural and/or artificial substances.

At step 423, a gas is dissolved into the carbohydrate solution. In some embodiments, air or oxygen is mixed into the carbohydrate solution by an aerator, such as aerator 316. As previously described, mixing air, oxygen, and/or other gases can reduce unwanted or undesirable compounds, dull particular flavors, and/or enhance desired flavors of the fermented carbohydrate solution. In further embodiments, carbon dioxide is dissolved into the carbohydrate solution at high pressures by a carbonator, such as carbonator 318. As previously described, the dissolution of carbon dioxide into the carbohydrate solution will give the beverage a desired effervescent quality. Method 400 ends at step 441 in which the carbohydrate solution is ready for consumption. In particular embodiments, steps 421 and 423 may be optional and need not be performed for the carbohydrate solution to be consumed.

Figure 5:
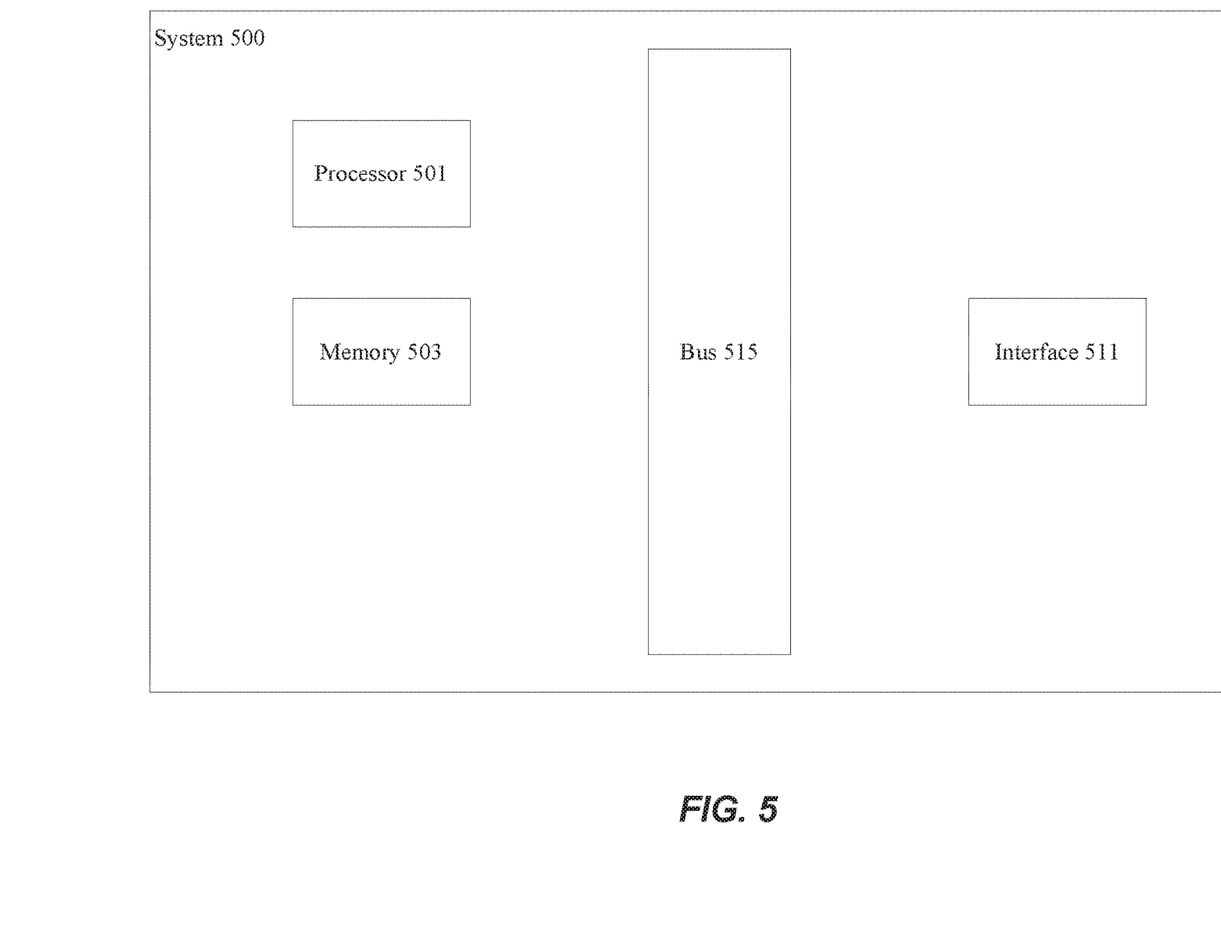
FIG. 5 is a block diagram illustrating an example of a system capable of implementing various processes described in the present disclosure.

FIG. 5 is a block diagram illustrating an example of a system 500 capable of implementing various processes described in the present disclosure. In some embodiments, system 500 may be device 300. In some embodiments, system 500 may represent programmable system controller 204 and/or 304. According to particular embodiments, a system 500, suitable for implementing particular embodiments of the present disclosure, includes a processor 501, a memory 503, an interface 511, and a bus 515 (e.g., a PCI bus or other interconnection fabric) and operates as a streaming server. In some embodiments, when acting under the control of appropriate software or firmware, the processor 501 is responsible for processing inputs received from a user interface, such as user interface 202 and/or 302. In other embodiments, the processor 501 is responsible for receiving relevant information from one or more databases and determining a predetermined temperature or period of time for fermentation, as described in FIG. 2. Various specially configured devices can also be used in place of a processor 501 or in addition to processor 501. In other embodiments, system 500 may also include one or more of the following elements: a pump, a timing element, a heating element, a thermostat, and a concentration detector.

The interface 511 is typically configured to send and receive data packets or data segments over a network, such as the Internet. In some embodiments, interface 511 is wireless interface 224 and/or 324. Interface 511 may also be configured to communicate with and control various device elements and components, such as the elements and components of device 300, as described in FIGS. 3A and 3B. Particular examples of interfaces supports include Ethernet interfaces, frame relay interfaces, cable interfaces, DST, interfaces, token ring interfaces, and the like, in addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions for operations including receiving user input, receiving information from various sources, automatically determining a predetermined temperature and/or period of time for fermentation, and/or controlling various device elements and components. The program instructions may control the operation of an operating system and/or one or more applications, for example. The memory or memories may also be configured to store received metadata and batch requested metadata. In some embodiments, memory 503 may be memory 226 and/or 326.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files co ring higher level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A device for fermentation, the device comprising:
   a container for housing an amount of a liquid carbohydrate solution therein;
   an atomizer coupled to the container, configured to receive the liquid carbohydrate solution from the container, wherein the atomizer converts the liquid carbohydrate solution into an aerosol suspension of particles into a first chamber and onto a first panel;
   a pressure mechanism, coupled to the atomizer, which causes a stream of gas to break up the liquid carbohydrate solution into fine droplets to generate the aerosol suspension of particles; and
   a first panel separating the first chamber from a second chamber, disposed beneath the first chamber, which receives the aerosol suspension of particles, the first panel including a fermentation agent thereon arranged on a porous medium to ferment the liquid carbohydrate solution,
   a pump wherein the liquid carbohydrate solution is collected in the second chamber and
      wherein the pump is configured to return the liquid carbohydrate solution to the atomizer until the liquid carbohydrate solution has been fermented to a desired state, and wherein the pump is configured to pressurize the first chamber at a first pressure and the second chamber at a second pressure, the first pressure being higher than the second pressure, thereby accelerating the movement of the liquid carbohydrate solution through the first panel and
      wherein the container, the atomizer, the pressure mechanism, the first panel and the pump are disposed in a housing and wherein the housing includes a panel slot which allows the first panel to be inserted and injected through the housing.

2. The device of claim 1, wherein the fermentation agent comprises a yeast culture or other microorganism.

3. The device of claim 1 further comprising a second panel, the second panel including a flavor agent, wherein the liquid carbohydrate solution is emitted as the aerosol suspension of particles onto the second panel such that the liquid carbohydrate solution is infused with a particular flavor or aroma of the flavor agent.

4. The device of claim 3, wherein the flavor agent includes crushed wood.

5. The device of claim 1 further comprising:
   a compartment for input of a carbohydrate supply; and
   a processing mechanism coupled to the compartment, wherein the processing mechanism produces the liquid carbohydrate solution from the carbohydrate supply.

6. The device of claim 1 further comprising a detector for measuring one or more of the following:
   a sugar content of the liquid carbohydrate solution;
   a pH level of the liquid carbohydrate solution; and
   an alcohol level of the liquid carbohydrate solution.

7. The device of claim 1 further comprising a carbonator for dissolving carbon dioxide into the liquid carbohydrate solution.

8. The device of claim 1 further comprising an aerator for circulating air through the liquid carbohydrate solution.

9. The device of claim 3, wherein the second panel is inserted through the panel slot.

10. The device of claim 3, wherein the housing includes a second panel slot wherein the second panel is inserted and ejected through the second panel slot.

11. The device of claim 1, wherein the housing further includes a lid.

12. The device of claim 11, wherein the lid is lined with a seal which prevents air from outside the housing from entering into an interior of the housing.

13. The device of claim 1, further comprising a user interface mounted to an exterior of the housing configured to receive inputs to control operation of the device.

14. The device of claim 13, wherein the user interface includes a wireless interface configured to communicate wirelessly with remote electronic devices.

15. The device of claim 1, further comprising a temperature regulator, a heating mechanism and a cooling mechanism for controlling an interior temperature of the device.

16. The device of claim 1, further comprising a system controller configured to control operation of the device including a processor and memory.

17. The device of claim 16, wherein the system controller is configured to control operation of the pump and the pressure mechanism.

* * * * *